United States Patent [19]

Lee et al.

[11] Patent Number: 5,567,258
[45] Date of Patent: Oct. 22, 1996

[54] MANUFACTURE OF INSULATED GLASS UNITS

[75] Inventors: Timothy C. P. Lee, Kenilworth; George B. Lowe, Anstey, both of England

[73] Assignee: Morton International Limited, England

[21] Appl. No.: 442,911

[22] Filed: May 17, 1995

Related U.S. Application Data

[63] Continuation of Ser. No. 153,010, Nov. 15, 1993, abandoned, which is a continuation of Ser. No. 850,219, Mar. 12, 1992, abandoned, which is a continuation of Ser. No. 589,461, Sep. 27, 1990, abandoned.

[30] Foreign Application Priority Data

Sep. 29, 1989 [GB] United Kingdom ............... 89222046

[51] Int. Cl.⁶ ............... B32B 31/28; B29C 71/04; B29C 65/14; H05B 6/64
[52] U.S. Cl. ............... 156/109; 156/275.5
[58] Field of Search ............... 156/99, 109, 107, 156/272.2, 275.5, 275.7, 292, 307.7; 264/25, 26, 489, 490, 261; 219/10.55 M, 10.57, 10.61 R, 684, 700

[56] References Cited

U.S. PATENT DOCUMENTS

| | | | |
|---|---|---|---|
| 3,657,038 | 4/1972 | Lightfoot | 156/99 |
| 3,749,874 | 7/1973 | Edgar | 219/10.55 |
| 3,936,412 | 2/1976 | Rocholl . | |
| 4,011,197 | 3/1977 | Lee | 528/10 |
| 4,083,901 | 4/1978 | Schonfeld et al. . | |
| 4,110,148 | 8/1978 | Rocholl . | |
| 4,268,553 | 5/1981 | Marzouki et al. | 156/109 X |
| 4,391,663 | 7/1983 | Hutter, III | 156/272.2 |
| 4,431,691 | 2/1984 | Greenlee | 156/109 X |
| 4,787,194 | 11/1988 | Lancaster et al. | 53/469 |
| 4,814,215 | 3/1989 | Lautenschlaeger et al. | 428/40 |
| 4,841,112 | 6/1989 | Peleg | 219/10.55 E |
| 4,943,456 | 7/1990 | Pollart et al. | 428/34.3 |

FOREIGN PATENT DOCUMENTS

| | | |
|---|---|---|
| 1055682 | 6/1979 | Canada . |
| 0069558 | 1/0000 | European Pat. Off. . |
| 0023412 | 2/1981 | European Pat. Off. . |
| 2251421 | 6/1975 | France . |
| 3400031 | 4/0000 | Germany . |
| 2114859 | 8/0000 | United Kingdom . |
| 8605541 | 9/1986 | WIPO . |
| 8907495 | 8/1989 | WIPO . |

OTHER PUBLICATIONS

George Menges & Thomas Strauch, Vernetzung mittels Mikrowellenenergie, Plastverarbeiter 35 (1985) Mai, No. 5, Spreyer, W. Germany.

*Primary Examiner*—Michael W. Ball
*Assistant Examiner*—Francis J. Lorin
*Attorney, Agent, or Firm*—Robert M. Didrick; Gerald K. White

[57] ABSTRACT

An insulated glass unit comprises two sheets of glass separated by an aluminum spacer, a thermosetting resin sealant such as a polysulphide or polyurethane sealant or a hot melt butyl sealant being applied around the edges of the unit to seal the sheets together. The spacer is connected by corner keys made of aluminum tape. Curing or melt-bonding of the sealant is accelerated by the application of microwave energy, suitably by passing the unit through a tunnel with microwave generators on each side thereof. The unit passes through the tunnel on a conveyor held upright by pinch chains. The conveyor and pinch chains are made of a nonpolar material such as polypropylene.

2 Claims, 2 Drawing Sheets

FIG. 1
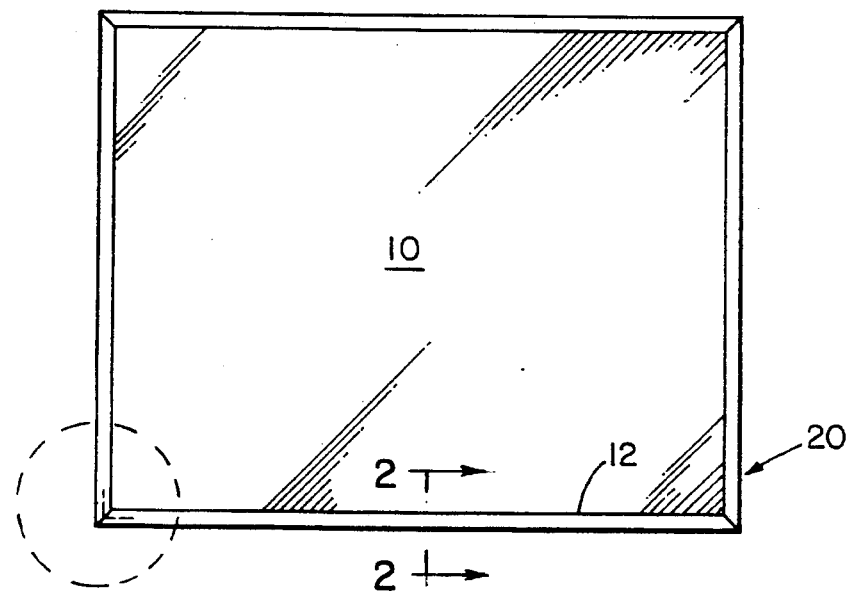
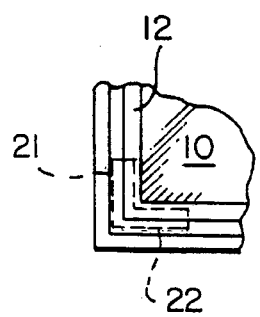
FIG. 1a
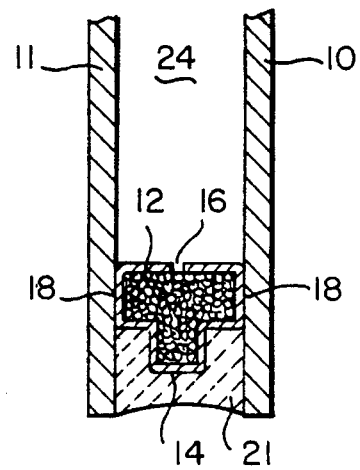
FIG. 2

5,567,258

MANUFACTURE OF INSULATED GLASS UNITS

This is a continuation of application Ser. No. 08/153,010 filed on Nov. 15, 1993 now abandoned, which was a continuation of application Ser. No. 07/850,219, filed Mar. 12, 1992, now abandoned, which was a continuation of application Ser. No. 07/589,461, filed Sep. 27, 1990 now abandoned.

BACKGROUND OF THE INVENTION

1) Field of the Invention

This invention relates to a method for the rapid production of insulated glass units, and in particular to the accelerated heat bonding or curing of the edge sealants of such units.

2) Description of the Prior Art

In a conventional insulated glass unit, two sheets of glass are placed parallel to one another with a small gap therebetween, this gap being maintained by longitudinal spacers between the sheets positioned just inside the peripheral edges of the sheets. The spacers generally contain a desiccant which is in communication with the gap between the glass sheets to absorb residual moisture. A liquid sealant such as a polysulphide, polyurethane or silicone sealant is then applied around the outside of the spacer between the peripheral edges of the sheets to seal the unit. These sealants are typically two-component systems, the base and the curing agent being mixed just prior to application to the glass.

More recently, integral sealing strips have been developed which comprise for example an extrusion of "hot melt butyl" which may incorporate a desiccant and optionally also a spacer, suitably in the form of an aluminum strip. Such strips can be supplied in rolls, stored in airtight containers.

In the manufacture of such units the sealant may require a long cure time, typically 2 to 4 hours, before the unit can be passed on to the next manufacturing stage. This creates particular problems in a continuous production line process since units have to be removed from the production line and stood for several hours. There arises the further possibility with liquid sealants that these may tend to flow during this cure period, particularly since the insulated glass (IG) units are generally in a vertical position during curing. Also, if a sealant system with a fast cure (and hence a short pot life) is used difficulties will arise if there is any delay in the IG unit production line.

One way of overcoming this difficulty has been to use one part hot melt sealant systems, such as the hot melt butyl strips discussed above, instead of the conventional two part systems which cure at room temperature. Hot melt systems however require high temperature and pressure to effect adhesion.

There is therefore a need for a method of putting energy into the chemically curing sealant to accelerate the cure. Straightforward heating in a hot air oven is however unsatisfactory since this also results in heating of the air in the cavity between the glass sheets which therefore has to be vented. Such heating also increases the temperature of the whole unit, including for example plastics spacers and corner pieces, which can also cause problems. The use of direct infra-red radiation also causes heating and expansion of the air in the cavity.

It is known from the prior art that microwave energy can be used to accelerate the curing of some polar resins. U.S. Pat. No. 4,011,197 discloses the microwave curing of organosiloxane compositions and U.S. Pat. No. 3,936,412 discloses microwave curing of thermoserring sealants such as polysulphides and polyurethanes.

SUMMARY OF THE INVENTION

According to the present invention, an uncured sealant is applied to an insulated glass unit and thereafter subjected to microwave energy to accelerate the cure. It has been found that, using selected materials and selected conditions, cure times of 2 to 4 hours can be reduced to as little as 1 to 2 minutes in this way.

The invention has been found to be particularly applicable to polysulphide sealants, preferably cured with manganese dioxide. Good results are also obtained with epoxide-polysulphide sealants and polyurethane sealants, as well as one part hot melt sealants such as those based on butyl rubber or polyisobutylene. The curing of the silicone sealants tested has been found to be less affected by such radiation but the use of such sealants is nevertheless contemplated within the scope of the present invention. An important advantage of the method of the invention is that only the sealant is heated significantly by the microwave energy. The glass, the spacers and the air space are not heated, except where they come into direct contact with the heated sealant.

The present inventors have now devised a system for applying microwave energy to insulated glass units as part of a continuous production line process which does not have to be interrupted to allow the sealant to cure. This system will be described in more detail hereinafter.

The microwave energy used will generally be in the frequency range from 900 to 5000 MHz, preferably 2000 to 3000 MHz and typically 2450 MHz. The total power input will preferably be within the range from 750 to 2000 W. Standard microwave generators can be used, these typically having an output of some 750 W. The microwave generators can be positioned on one or both sides of a tunnel through which the IG unit is passed, at selected heights to ensure that the whole unit is subjected to the radiation. Typically three 750 W generators will be used, a total operating power of for example 1500 W being tapped off from these.

BRIEF DESCRIPTION OF THE DRAWINGS

Further features and advantages of the invention will become apparent from the following detailed description when read with reference to the accompanying drawings, which illustrate preferred embodiments thereof.

In the Drawings:

FIG. 1 shows a sealed double glazed unit of the type to which the process of the present invention may be applied;

FIG. 1a shows an enlarged detail of one corner of the unit;

FIG. 2 is an enlarged cross section on the line II—II in FIG. 1;

DETAILED DESCRIPTIONS OF THE PREFERRED EMBODIMENTS

Figure 3:
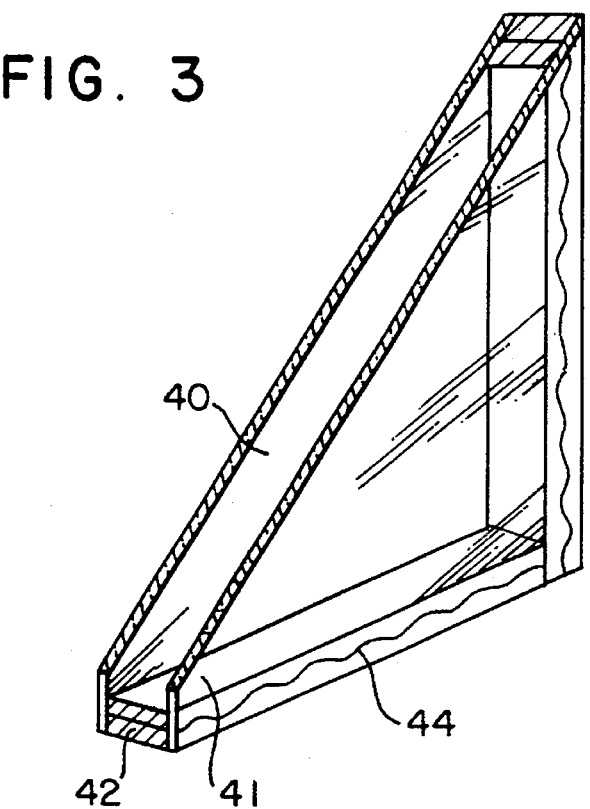
FIG. 3 is a perspective view of one corner of a double glazing unit incorporating an alternative form of sealant supplied as an integral strip with a built-in spacer.

Referring first to FIGS. 1 and 2, two glass sheets 10 and 11 are secured together in a parallel configuration with elongate spacers 12 between them. The spacers are positioned parallel to each of the peripheral edges of the sheets, a small distance in from the respective edge so as to leave space for a sealant, and joined together by corner keys 22. The spacers are filled with a desiccant 16, which is in communication with the gap 24 between the sheets through elongate slots 16 or a series of apertures so as to absorb moisture.

The sheets 10, 11 are preliminarily bonded to the spacers by a butyl sealant 18 or the like to hold them in position during curing. The peripheral gap between the sheets outside the spacers is then filled with an uncured sealant material 20.

The spacers may suitably be made from aluminium but may also be of plastics material such as polycarbonate or polypropylene. Nylon has however been found unsuitable for this purpose since it tends to heat up too fast owing to its high polarity. Surprisingly, aluminum spacers heat up less fast and can be used in the process of the invention. Aluminium spacers should however be connected by metal corner keys (suitably also aluminium) to prevent arcing. Alternatively, a single length of aluminium spacer can be bent to the desired shape. One advantage of plastics, for example polycarbonate, spacers over aluminium ones is that the plastics spacers allow the desiccant to absorb microwave energy and warm up, giving additional background heating, without overheating, to accelerate the cure.

FIG. 3 shows an alternative form of double glazing unit wherein two parallel glass sheets 40, 41 are sealed together by a one component extruded sealing strip 42 of hot melt butyl rubber or the like. The strip incorporates an aluminium spacer in the form of a strip which has an undulating shape to impart rigidity in the transverse direction. Such strips are obtainable from Tremco Inc of Cleveland, Ohio, U.S.A., under the Registered Trade Mark SWIGGLE STRIP. The strip is positioned around the edges of one sheet, laid flat, and the other sheet is then laid on top. The unit thus formed is then subjected to microwave heating in accordance with the invention.

Figure 4:
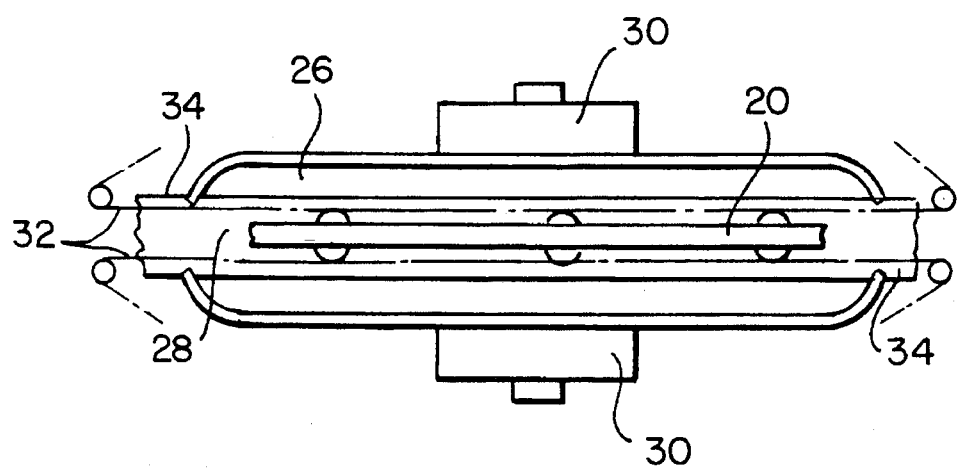
FIG. 4 is a schematic plan view of a tunnel used to apply microwave energy to an IG unit in accordance with the invention.

Referring now to FIG. 4, there is shown schematically a tunnel 26 through which an insulated glass unit 20 is passed on a polypropylene track 28 to be subjected to microwave energy. As shown in FIG. 4, the IG unit passes through in a vertical position.

In FIG. 4, the microwave generators 30 are shown positioned on both sides of the tunnel. They could however be positioned on only one side, in any suitable configuration.

The inner walls of the tunnel 26 are preferably of reflective material such as polished stainless steel, so as to distribute the microwave radiation throughout the tunnel. Sensors may be provided to detect the size of the unit to be treated before it enters the tunnel, so that the total output of microwave energy can be adjusted accordingly. For example, if a unit of small height is to be treated, the uppermost microwave generators might be switched off altogether. Means may also be provided for stirring the air within the tunnel so as to obtain a more uniform distribution of energy.

A typical apparatus as shown in FIG. 4 might be designed to accommodate IG units ranging in size from 300 mm×300 mm to 2.5M×1M. To hold the IG unit in its vertical position and, if necessary, to press the two sheets together to maintain adhesion, a pinch chain system 32 is provided. This comprises polypropylene chains on each side of the IG unit designed to exert an inward pressure on the unit. The pinch chains may suitably be made of polypropylene carried on end sprockets and supported along their length by a polypropylene structure (not shown). The conveying chain 28 which supports the unit is also suitably made of polypropylene. The use within the tunnel of components made from a low-polarity polymer such as polypropylene ensures that these components do not themselves absorb microwave energy.

Microwave chokes 34 are provided at each end of the tunnel.

IG units may be passed in series through the tunnel in a continuous process, each unit as it leaves the tunnel passing on to a second guide track where it is unloaded from the equipment to be passed on to the next production stage.

It is envisaged that the present invention may be used with a wide variety of sealants including those based on liquid polysulphides such as LP32 manufactured by Morton International Inc, epoxy-modified liquid polysulphides, liquid polysulphide/epoxy adducts, polyurethane resins, one-part hot melt butyls and indeed all sealants designed to be susceptible to microwave heating. Such a design may include the addition of an amount of water or other polar materials to facilitate the absorption of microwave energy into the sealant to accelerate the cure.

The residence time of the IG unit in the tunnel may be varied by varying the track speed and/or the power output. A typical residence time will be 60 to 120 seconds, at the end of which the sealant should be substantially cured.

The following trials were carried out using IG units of 300 mm×300 mm with Thermobar polycarbonate spacers containing Duosorb desiccant. The sealant used was Evode 2850, a polysulphide based sealant, applied by hand. The sealant was mixed with a spiral blade for 3 minutes prior to application. Trials 1 to 6 were carried out in a batch process, were the IG units were not rotated continuously. The microwave supply was 620 W. The following results were obtained.

TRIAL 1

Full power 1 min, Max sealant temperature 120° C., Min sealant temperature 30° C. Non-uniform cure, some bubbling visually apparent.

TRIAL 2

310 watts for 90 secs. Sealant temperature 40°–45° C. sealant not cured.
Further 90 secs. Sealant not cured.
Further 90 secs. Sealant temperature 50° C. Good cure. Unit handleable.

TRIAL 3

465 watts 30 secs. Unit rotated through 90° (not checked for cure)
Further 30 secs. Sealant temperature variable, 40°–70° C. Sealant not cured.
Further 30 secs. Sealant temperature 55°–70° C. Good cure. Unit handleable.

TRIAL 4

465 watts 45 secs. Unit rotated through 90° (not checked for cure).
Further 45 secs. Sealant temperature 55°–70° C./Excellent cure.

TRIAL 5

65 watts 1 minute. Unit rotated through 90° (not checked for cure).

Further 1 minute sealant temperature 90° C. Some foaming on joint face otherwise excellent cure.

TRIAL 6

This unit was made at the end of the sealant's work life (45 minutes after end of mixing).
465 watts 45 secs. Unit turned through 90°.
Further 45 secs. Good cure, no bubbling.

A power output of 465 watts was thus found to be suitable for such a small unit. The output can of course be increased as required to accommodate larger units.

Trials 7–14 were conducted on units 510 mm×360 mm on a conveyor, horizontal bed microwave tunnel. Fixed travel speed.

| | POWER (WATTS) | TIME (SECS) | SEALANT TEMPERATURE | COMMENTS |
|---|---|---|---|---|
| TRIAL 7, using Aluminium spacer and Polysulphide Sealant. | | | | |
| 1st period | 750 | 90 | 30 deg. C. | No cure |
| 2nd period | 750 | 90 | 34 deg. C. | " |
| 3rd period | 750 | 90 | — | " |
| 4th period | 1500 | 60 | — | part cure |
| 5th period | 1500 | 60 | — | Cure |
| TRIAL 8 | 3000 | 120 | — | Variable cure |
| TRIAL 9 | 3000 | 120 | 100 1st. corner | Variable cure |
| | | | 65 long side | |
| | | | 100 2nd corner | |
| | | | 90 3rd corner | |
| | | | 74 4th corner | |
| TRIAL 10 Aluminium tape put across one corner to prevent arcing. | | | | |
| | 3000 | 120 | 150 2nd corner (with tape) | Variable cure |
| TRIAL 11 Aluminium tape on all corners. Reasonable. | | | | |
| | 3000 | 120 | 91 1st corner | cure |
| | | | 84 2nd corner | |
| | | | 77 3rd corner | |
| | | | 92 4th corner | |
| TRIAL 12 Construction as above. | | | | |
| | 3000 | 90 | — | not cured |
| TRIAL 13 Aluminium spacer, Aluminium on corners, no desiccant. | | | | |
| | 3000 | 120 | — | Cured to handle |
| TRIAL 14 Polycarbonate spacer with desiccant. | | | | |
| | 3000 | 120 | 84° C. | well cured |
| TRIAL 15 Desiccant Alone. | | | | |
| | 750 | 30 | 50° C. | |

This final test shows the desiccant to be a high energy absober.

What is claimed is:

1. In a method of manufacturing an insulated glass unit wherein two glass sheets are positioned adjacent one another and spaced apart by aluminum strips positioned parallel to each of the peripheral edges of the sheets to define an air gap between them and wherein an uncured sealant is applied between the edges of the sheets to form a sealed unit and subsequently heated to bond it, an improvement comprising connecting the aluminum strips with metal corner keys to prevent arcing and subjecting the sealant, alUminUm strips and corner keys to microwave energy to effect said heat-bonding wherein the corner keys are made of aluminum tape.

2. The method of claim 1 wherein the sealant is selected from the group consisting of liquid polysulfides and liquid polysulfide/epoxy adducts.

* * * * *

UNITED STATES PATENT AND TRADEMARK OFFICE
CERTIFICATE OF CORRECTION

PATENT NO. : 5,567,258

DATED : October 22, 1996

INVENTOR(S) : Lee et al.

It is certified that error appears in the above-indentified patent and that said Letters Patent is hereby corrected as shown below:

Col. 6, Ln. 32, correct "alUminUm" to read -- aluminum -- .

Signed and Sealed this

Twelfth Day of January, 1999

Attest:

Attesting Officer

*Acting Commissioner of Patents and Trademarks*